Patented Oct. 28, 1941

2,260,967

UNITED STATES PATENT OFFICE 2,260,967

COMPLEX QUATERNARY AMMONIUM SALT

Herman A. Bruson, Philadelphia, Pa., assignor to The Resinous Products & Chemical Company, Philadelphia, Pa.

No Drawing. Application December 10, 1938, Serial No. 244,923

14 Claims. (Cl. 260—404)

This invention relates to new quaternary ammonium salts derived from complex phenolic ester bases, and is a continuation in part of copending application Serial No. 240,009, filed on November 12, 1938 now Patent No. 2,218,739 issued October 22, 1940.

According to this invention, new substances having useful properties are prepared by condensing any organic acyl halide with a complex nitrogenous inter-condensation product of a methylol-forming phenol, formaldehyde, and a strongly basic, non-aromatic secondary amine to form an ester hydrohalide salt, and subsequently reacting upon the free ester base derived therefrom, with an alkylating or aralkylating agent capable of converting said ester base into a quaternary ammonium salt.

Nitrogenous phenolic inter-condensation products of a methylol-forming phenol, formaldehyde, and a strongly basic, non-aromatic secondary amine of the kind used for the present purpose have been in part disclosed by the applicant in U. S. Patents Nos. 2,031,557, 2,033,092, 2,036,916, 2,040,039, 2,040,040, and 2,045,517. These may be oily, crystalline or even resinous in nature. The compounds obtained directly by the reaction of organic acyl halides, and these phenolic nitrogenous inter-condensates are hydrohalide salts of phenolic esters containing aliphatically-bound tertiary amine groups. From these hydrohalide salts, the free nitrogenous bases are obtained by neutralization of the hydrogen halide radical with alkali. These free bases, in turn, combine with alkylating or aralkylating agents to form quaternary ammonium salts which are useful as wetting, cleansing, emulsifying and dispersing agents that may be used in bleaching, dyeing, mordanting, mothproofing and surface-treating fibrous materials, such as cotton, cellulose, rayon, wool, silk, paper, feathers, hair and leather. Particularly valuable textile assistants are obtained when either the acyl halide employed or the nitrogenous phenolic inter-condensate, or both, contain an aliphatic or alicyclic hydrocarbon group of 8 to 18 carbon atoms inclusive but the new compounds are not confined to these substituents.

When the phenol employed contains nuclear halogen, cyano, thio, thiocyano, nitro, sulfone, alkoxy, aryloxy, or acylamino groups, particularly valuable products are obtained which are toxic to insects and lower forms of animal life, and which may be employed as insecticidal, fungicidal, and bactericidal agents.

With due regard to the character of the complex nitrogenous condensate of the methylol-forming phenolic body employed for the process, as described above, the present invention is applicable to any monocarboxylic or polycarboxylic acid halide of the aliphatic, aromatic, alicyclic, of heterocyclic series of the formula $R(COX)_n$, wherein R is any organic radical, X is halogen, and $n$ is a small integer.

Typical acylating agents for the purpose are acetyl chloride, chloracetyl chloride, propionyl chloride, isobutyryl chloride, caproyl chloride, 2-ethyl hexoyl chloride, dodecanoyl chloride, oleic acid chloride, palmitic acid chloride, stearoyl chloride, crotonyl chloride, acrylyl chloride, methacrylyl chloride, undecenoyl chloride, naphthenic acid chloride, ricinoleic acid chloride, phenylacetyl chloride, tetrahydrofuroyl chloride, linoleic acid chloride, octyloxyacetyl chloride, licanic acid chloride, cinnamoyl chloride, benzoyl chloride, p-nitrobenzoyl chloride, phenoxyacetyl chloride, campholic acid chloride, abietic acid chloride, α-bromstearoyl chloride, benzoyl-o-benzoyl chloride, the corresponding acid bromides and homologues or substitution products thereof or their obvious equivalents.

Typical complex phenolic-formaldehyde-secondary amine condensates which may be employed include the resinous as well as non-resinous tertiary nitrogenous condensation products of methylol-forming phenolic compounds with at least molecular equivalents each of formaldehyde and of strongly basic, non-aromatic, secondary amines of the aliphatic, alicyclic, or heterocyclic series, including amines having from 2 to 18 carbon atoms and upwards. Examples of suitable amines are dimethylamine diethylamine, dibutylamine, diamylamine, diallylamine, methyl-dodecylamine, methyl-oleyl amine, dicyclohexylamine, morpholine, piperidine, piperazine, pyrrolidine, diethanolamine, triethylene tetramine, and the like.

The phenols which are reacted with formaldehyde and the above amines to furnish the complex nitrogenous condensate, which is to be condensed with the acyl halide, are those aromatic hydroxy compounds which are capable of forming methylol derivatives with formaldehyde. The phenols, in a broad way, belong to the class of hydroxy or polyhydroxy aromatic compounds of either monocyclic or polycyclic structure which contain at least one reactive nuclear position ortho or para to the phenolic hydroxyl group. The phenols which meet these conditions and are operable in this inter-condensation are termed "methylol-forming" phenols.

Typical examples of such phenols are: phenol, α- or β-naphthol, o-, m-, p-cresol, xylenol (1,2,4, and 1,3,5), the various straight or branched chain alkyl phenols, such as propyl-, iso-propyl-, butyl-, amyl-, hexyl-, heptyl-, octyl-, nonyl-, undecyl-, dodecyl-, tetradecyl-, hexadecyl-, oleyl-, octadecyl-phenols; the cycloalkyl or aralkyl phenols, such as cyclohexyl-, bornyl-, camphyl-, benzyl-, or phenyl-phenols, as well as nuclear alkyl, cycloalkyl, aryl, aralkyl, hydroxyl, nitro, acyl, acylamino, halogen, thio, sulfone, aryloxy or alkoxy derivatives thereof, including guaiacol, resorcinol, hydroquinone, pyrocatechol, pyrogallol, p-benzoyl phenol, p-acetyl-aminophenol, o-, m-, p-chlorphenol, o-, m-, p-bromphenol, p,p'-dihydroxydiphenyl dimethylmethane, p-hydroxystearophenone, p-dodecanoylphenol, phenolic-formaldehyde resins in the "A" stage and other phenolic compounds such as p,p'-dihydroxydiphenyl sulfoxide, p,p'-dihydroxydiphenyl sulfide, p,p'-dihydroxydiphenyl sulfone, hydroxyanthracenes, hydroxyphenanthrenes, and the like.

The reaction between the acyl halide and the complex nitrogenous condensation product of formaldehyde, secondary amine, and the methylol-forming phenol may be carried out in the presence or absence of an inert organic solvent. The chief requirement of the process is that the acyl halide and the inter-condensation product are mixed in such a way that the reaction between them is controlled. The permissible rate of addition of one reactant to the other will depend upon the temperature as well as on the nature of the particular reactants. In general, there is a wide range of temperatures at which the reaction may be carried out, so long as no appreciable amount of insoluble resinous material results. The proportion of acyl halide required is at least one acyl halide group for each hydroxyl group to be esterified. As a result of the reaction, a product is obtained which is the hydrohalide salt of a phenolic tertiary amine, the phenolic hydroxyl of which is esterified by the acyl group. These complex ester salts are usually water-soluble compounds, the higher alkylated members of which in aqueous solution foam when shaken and show typical soap-like properties. Upon neutralization with a strong alkali hydroxide, the salt-forming radical is removed and the free acylated complex phenolic bases are formed. These ester bases can, in the case of the lower members, be distilled under reduced pressure without decomposition. The higher members are water-insoluble oils or resinous materials. The bases react to form quaternary ammonium salts with agents for alkylation such as dialkyl sulfates (dimethyl sulfate, diethyl sulfate), methylene halides such as aralkyl halides (benzyl chloride, benzyl bromide), and aliphatic halides (methyl iodide, ethylene, dibromide, allyl bromide, methallyl chloride, β,β'-dichloro-diethyl ether, ethylene bromhydrine), organic esters (methyl thiocyanate, dimethyl oxalate, methyl formate, ethyl chloracetate) etc. Those quatenary ammonium salts which are water-soluble are useful as bactericides, mothicides, textile softening agents, flotation agent, dyestuff fixatives, corrosion inhibitors, and mordanting, emulsifying, creaseproofing, wetting, and cleansing agents, and are also useful for "animalizing" cellulosic fibers so that they may be dyed with silk or wool dyestuffs. The higher members are useful for breaking certain types of petroleum and other emulsions.

The following examples illustrate this invention:

Example 1

To a solution of 94 g. of phenol in 125 g. of aqueous 36% commercial dimethylamine solution (1 mol) there is added dropwise 100 g. of aqueous 30% formaldehyde solution (1 mol) with stirring and the reaction mixture maintained at 30° C. by cooling. The mixture is allowed to stand 24 hours at 25–30° C. and the lower oil layer drawn off and washed several times with water. It is then distilled under reduced pressure and the fraction boiling at 97–103° C./13 mm. collected. It is a pale reddish oil containing 8.9% nitrogen by analysis.

To a solution of 45.3 g. of this oil dissolved in 125 cc. of methyl ethyl ketone, there is added dropwise with stirring and cooling to about 20° C. 60 g. of cocoanut oil mixed fatty acid chlorides (obtained by treating mixed fatty acids of cocoanut oil with phosphorus trichloride). The clear solution obtained is then evaporated under reduced pressure on a steam bath to remove the solvent. The product obtained is a waxy mass which is the hydrochloride of the nitrogenous phenolic ester of mixed cocoanut oil fatty acids. It is mixed with water and the phenolic ester base set free at 10–15° C. by the careful addition of aqueous 10% sodium hydroxide solution till the solution is faintly pink to phenolphthalein indicator. The free phenolic ester base separates as a pale yellow oil containing 4.14% nitrogen by analysis. It is soluble in dilute lactic or acetic acids to give foamy, soapy solutions. It is converted into quaternary ammonium salts as follows:

(a) Twenty parts of the above free base of the phenolic ester is heated with 7.6 parts of benzyl chloride at 90–95° C. for three hours. The product obtained is a viscous resin which, when dissolved in water, is capable of forming insoluble precipitates with direct dyestuffs containing sulfonic acid groups and may be used therefore for fixing dyestuffs to textile fibers. It may also be used to give rayon a soft, supple feel, and for "animalizing" cotton or rayon fibers so that they will take the usual silk dyestuffs.

(b) By using 10 parts of diethyl sulfate in place of the benzyl chloride as in (a) above, the corresponding quaternary ammonium sulfuric ester is obtained as a pale yellow oil. It dissolves in water to give a foamy solution useful as a flotation agent.

In the above example the cocoanut oil mixed fatty acid chlorides may be replaced mol for mol by stearic acid chloride, naphthenic acid chloride or oleic acid chloride to yield the corresponding stearic, naphthenic, or oleic acid esters of the complex phenolic amine. These are pale yellow oils which combine with benzyl chloride, methallyl chloride, or dimethyl sulfate at 80–100° C. to give water-soluble quaternary ammonium salts having capillary-active properties.

Example 2

To a mixture consisting of 300 g. of p-tertiary butylphenol and 396 g. of aqueous 25% dimethylamine solution in 150 cc. of ethanol, there is added dropwise, with stirring and cooling to 30–35° C., 220 g. of 30% formaldehyde solution. After stirring for four hours and allowing to stand for 18 hours at room temperature, the oil layer is separated, washed and distilled under reduced pressure. The phenolic amine comes over at 150–160° C./12 mm. as a pale yellow or colorless oil which, upon redistillation, boils at 145–150° C./5 mm. and contains 6.4% nitrogen by analysis.

(a) To a solution of 62.1 g. of this oil in 150 g. of dry benzene there is added gradually, with stirring, 53.5 g. of n-dodecanoyl chloride, at a temperature of 30–40° C. After stirring for two hours, the solution is neutralized in the cold with 10% sodium hydroxide solution, and the benzene layer separated, washed, dried and filtered. After removing the benzene by evaporation under reduced pressure, the free basic phenolic ester of dodecanoic acid is obtained as a pale yellow oil.

(b) 34.9 g. of this ester is heated with 12.6 g. of benzyl chloride for four hours at 90–95° C. The quaternary ammonium salt obtained is a viscous syrup having useful emulsifying properties.

(c) By using 42.2 g. of benzoyl chloride in place of the dodecanoyl chloride in (a) above, the benzoic acid ester of the phenolic complex amine is obtained as a crystalline product boiling at 179–184° C./3 mm. and melting at 89–90° C. (from petroleum ether). It combines with allyl bromide or benzyl bromide at 90° C. to give the corresponding quaternary ammonium bromides as resinous masses.

*Example 3*

To a solution of 103 g. of p-α,α,γ,γ-tetramethyl-butyl phenol (Jour. Amer. Chem. Soc. 55, 2571 (1933)) in 100 cc. of 95% ethanol there was added 50 g. of aqueous 30% of formaldehyde and then while cooling to 30–40° C. and stirring 56 g. of aqueous 41% dimethylamine solution was gradually added. The mixture was allowed to stand for 24 hours at room temperature. The lower oil layer was drawn off and allowed to crystallize in the cold. After recrystallization from 95% ethanol it formed colorless crystals, m. p. 69° C. having the formula:

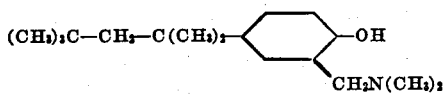

To a solution of 26.3 g. of this product in 80 cc. of benzene there is added gradually 7.8 g. of acetyl chloride while stirring and cooling to 10° C. In a short time the mixture sets to a crystalline paste of the acetyl ester hydrochloride, which is filtered off. It dissolves in water to give a foamy, soapy solution. Such a solution, containing 15 g. of the salt in 100 cc. of water, is neutralized in the cold with 10% sodium hydroxide solution. The acetyl ester of the phenolic free base separates as an oil which, when shaken out with ether, washed and distilled in vacuo boils at 153–155° C./2 mm. It is a colorless oil.

The quaternary ammonium salt is obtained by heating a mixture of 8.7 parts of this oil with 3.6 parts of benzyl chloride at 90–100° C. for several hours. It is a colorless, hard, glassy mass.

*Example 4*

To a solution of 228 g. of p,p′-(dihydroxy diphenyl)-dimethyl-methane, 400 cc. of methanol, and 204 cc. of aqueous 30% formaldehyde solution there was added gradually with stirring and cooling to 25–30° C. 404 cc. of 25% aqueous dimethylamine solution. Stirring was continued for three hours and the mixture then allowed to stand for 18 hours at room temperature. The oil layer was then separated, washed with water and dried in vacuo on the steam bath. The product was a thick, sticky resinous mass containing 7.6% nitrogen by analysis.

To a solution of 68.4 g. of the above resin in 200 cc. of benzene there was added gradually 16.5 g. of acetyl chloride while stirring the solution and keeping the temperature below 40° C. The acetic ester hydrochloride obtained was a water-soluble resinous material. It was removed, dissolved in water and the cooled solution treated at 10–15° C. with 10% sodium hydroxide solution until faintly pink to phenolphthalein indicator. The oil which separated was extracted with ether, washed, dried, and freed of solvent on a steam bath. The product obtained was a viscous reddish oil containing 6.3% nitrogen by analysis, consisting essentially of a product having the formula:

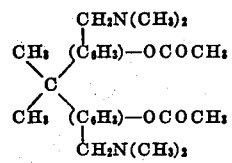

11 g. of this diester ditertiary amine was mixed with 6.55 g. of benzyl chloride and heated at 70–75° C. for 6 hours. The quaternary ammonium salt formed was a resinous solid which was readily soluble in water. The aqueous solution, when titrated with silver nitrate solution, showed ionic chloride to the extent of 10.3% indicating that the essential component present was the di-quaternary ammonium salt having the formula:

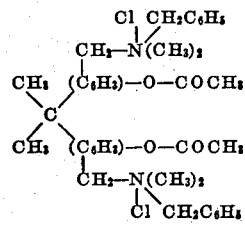

The corresponding lauric acid di-ester quaternary ammonium salt, obtained by using lauroyl chloride in place of the acetyl chloride in the above example, is a soapy solid useful for giving cellulose a soft, supple feel. For its preparation, 44 g. of lauric acid chloride is employed in place of the acetyl chloride.

*Example 5*

To a solution of 70 g. of 3-chloro-4-hydroxy toluene, 100 cc. of methanol and 74 cc. of 30% formaldehyde solution there is gradually added 148 cc. of 25% dimethylamine solution, while stirring and cooling to 20–25° C. After stirring for several hours, the oil layer is separated and dried under vacuum. It contains 6.98% nitrogen by analysis corresponding to the formation of the compound:

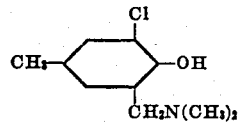

A solution of 40 g. of the above phenolic base in 200 cc. of benzene is treated at 10–15° C. with 16.5 g. of acetyl chloride. The ester hydrochloride separates as a crystalline powder, m. p. 185–191° C. A solution of 28 g. of this powder in 200 cc. of water is neutralized in the cold with 10% sodium hydroxide solution. The free base separates as a reddish oil which is taken up in ether, washed and dried on a steam bath.

10 g. of the above oil is mixed with 5.6 g. of benzyl chloride and warmed at 70–75° C. for 8 hours. The product is a brown, brittle resin which dissolves in water.

Example 6

To a solution of 26 g. of di-(morpholinomethyl)-resorcinol (U. S. Patent No. 2,040,040) in 250 cc. of methyl ethyl ketone there is added gradually at 80° C. 11 g. of 2-ethyl butyryl chloride. The whole precipitate is filtered off, washed with dry acetone and dried. It is dissolved in water and exactly neutralized with dilute sodium hydroxide. The crystalline ester base which separates is removed and dried. Upon heating 5.5 g. of this ester base with 3.5 g. of benzyl chloride for 10 hours at 70–75° C., a crumbly reddish solid is obtained which is moderately soluble in water.

I claim:

1. A quaternary ammonium salt of an organic carboxylic acid ester of a nitrogenous phenolic condensation product obtained from a methylol-forming phenol with at least one molecular equivalent each of formaldehyde and a strongly basic, non-aromatic secondary amine.

2. A quaternary ammonium salt of a fatty acid ester of a nitrogenous phenolic condensation product obtained from a methylol-forming phenol with at least one molecular equivalent each of formaldehyde and a strongly basic, non-aromatic secondary amine.

3. A quaternary ammonium salt of an organic carboxylic acid ester of a complex nitrogenous condensation product obtained from a methylol-forming phenol with at least one molecular equivalent each of formaldehyde and dimethylamine.

4. A quaternary ammonium salt of a fatty acid ester of a complex nitrogenous condensation product obtained from a methylol-forming phenol with at least one molecular equivalent each of formaldehyde and dimethylamine.

5. A quaternary ammonium salt of a higher fatty acid ester of a complex nitrogenous condensation product obtained by reacting p,p'-(dihydroxy diphenyl)-dimethyl methane with at least one molecular equivalent each of formaldehyde and dimethylamine.

6. A quaternary ammonium salt of the lauric acid ester of the complex nitrogenous condensation product obtained by reacting phenol with at least one molecular equivalent each of formaldehyde and dimethylamine.

7. A quaternary ammonium salt obtained by reacting benzyl chloride and the lauric acid ester of the complex nitrogenous condensation product of phenol with at least one molecular equivalent each of formaldehyde and dimethylamine.

8. A quaternary ammonium salt obtained by reacting benzyl chloride and the oleic acid ester of the complex nitrogenous condensation product of phenol with at least one molecular equivalent each of formaldehyde and dimethylamine.

9. A quaternary ammonium salt obtained by reacting an alkylating agent and a tertiary amine which is an organic carboxylic acid ester of the condensation product of a phenol with at least one molecular equivalent each of formaldehyde and a strongly basic, non-aromatic secondary amine.

10. A quaternary ammonium salt obtained by reacting a methylene halide and a tertiary amine which is an organic carboxylic acid ester of the condensation product of a phenol with at least one molecular equivalent each of formaldehyde and a strongly basic, non-aromatic secondary amine.

11. A quaternary ammonium salt obtained by reacting an alkylating agent and a tertiary amine which is an organic carboxylic acid ester of the condensation product of a phenol with at least one molecular equivalent each of formaldehyde and a strongly basic-non-aromatic secondary amine.

12. A process for producing a quaternary ammonium salt which comprises reacting an alkylating agent and a tertiary amine which is an organic carboxylic acid ester of the condensation product obtained from a phenol with at least one molecular equivalent each of formaldehyde and a strongly basic, non-aromatic secondary amine.

13. A process for producing a quaternary ammonium salt which comprises reacting a methylene halide and a tertiary amine which is an organic carboxylic acid ester of the condensation product obtained from a phenol with at least one molecular equivalent of each formaldehyde and a strongly basic, non-aromatic secondary amine.

14. A process for producing a quaternary ammonium salt which comprises reacting an alkylating agent and a tertiary amine which is an organic carboxylic acid ester of the condensation product obtained from a phenol with at least one molecular equivalent of each formaldehyde and a strongly basic, non-aromatic secondary amine.

HERMAN A. BRUSON.